United States Patent
Xenakis et al.

(10) Patent No.: US 7,742,450 B2
(45) Date of Patent: Jun. 22, 2010

(54) METHOD FOR EFFICIENT BEARER TRAFFIC ROUTING IN A COMMUNICATION SYSTEM

(75) Inventors: George Xenakis, Tempe, AZ (US); Nandakishore A. Albal, Scottsdale, AZ (US); Peter J. Armbruster, Chandler, AZ (US); Thomas G. Hallin, Wheaton, IL (US); Bradley R. Schaefer, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1862 days.

(21) Appl. No.: 10/779,893

(22) Filed: Feb. 17, 2004

(65) Prior Publication Data
US 2005/0180389 A1    Aug. 18, 2005

(51) Int. Cl.
*H04W 4/00* (2009.01)
(52) U.S. Cl. .............. 370/331; 370/351; 370/401; 455/432.1; 455/436
(58) Field of Classification Search ............. 370/338, 370/352, 401, 331, 351; 455/432–435.2, 455/433, 436, 456.1, 445
See application file for complete search history.

(56) References Cited

U.S. PATENT DOCUMENTS

| | | | | |
|---|---|---|---|---|
| 5,479,478 A | * | 12/1995 | Fath | 455/459 |
| 5,509,062 A | * | 4/1996 | Carlsen | 379/211.02 |
| 6,067,452 A | * | 5/2000 | Alexander | 455/428 |
| 6,470,010 B1 | * | 10/2002 | Szviatovszki et al. | 370/356 |
| 6,751,204 B1 | * | 6/2004 | Foti et al. | 370/328 |
| 6,791,958 B2 | * | 9/2004 | Spear et al. | 370/331 |
| 6,961,575 B2 | * | 11/2005 | Stanforth | 455/445 |
| 7,184,421 B1 | * | 2/2007 | Liu et al. | 370/338 |
| 7,200,400 B2 | * | 4/2007 | Creamer et al. | 455/437 |
| 2002/0051432 A1 | | 5/2002 | Shin | |
| 2002/0150091 A1 | | 10/2002 | Lopponen et al. | |
| 2003/0129981 A1 | * | 7/2003 | Kim | 455/436 |
| 2003/0210666 A1 | * | 11/2003 | Trossen et al. | 370/331 |
| 2004/0077345 A1 | * | 4/2004 | Turner et al. | 455/423 |
| 2004/0125770 A1 | * | 7/2004 | Pitt et al. | 370/331 |

* cited by examiner

*Primary Examiner*—William Trost, IV
*Assistant Examiner*—Roberta A Shand

(57) ABSTRACT

A method for routing bearer traffic (70') between 3G networks (32, 42) and 2G networks (12, 22) and vice versa uses voice signaling gateways (VSGW)(14, 24, 34, 44). The method determines a VSGW nearest the calling party (11). The nearest VSGW directly routes (86) the bearer traffic through the inter-network (50) to the called party (31) and avoids the "tromboning" effect of always sending bearer traffic to the called party's home location.

17 Claims, 3 Drawing Sheets

METHOD FOR EFFICIENT BEARER TRAFFIC ROUTING IN A COMMUNICATION SYSTEM

BACKGROUND OF THE INVENTION

The present invention pertains to data transmission among networks in a communication system and more particularly to the routing of bearer traffic among these networks of the communication system.

Call processing in modern communications is typically divided into two segments. First, the networks of the communication system use various signaling schemes to set up a path from an originator to a terminator. The second portion of the call is the sending of bearer traffic, whether the bearer traffic be data or human voice. The signaling portion of the call is governed by the rules of each of the networks and call engines of the network. This signaling process may become complex due to roaming mobile telephone subscribers.

The amount of signaling information transmitted through the communication system is quite minimal as compared to the amount bearer traffic. Therefore, efficient transmission paths for bearer traffic greatly improves overall communication system efficiency and transmission capability, and improves how resources may be used in the network.

As an example of a mobile communication system bearer traffic routing issue, mobile subscribers homed in one geographic area but roaming in another distant geographic area may have their data routed from the second area to the first area and back to the second area again. This is an inefficient routing and such bearer traffic routing exhibits an effect called tromboneing. That is the system and various networks of the system must use greater portions of their switching and transmission capability to service such a call. As a result, such bearer traffic routing is inefficient as wasting communication system resources and increasing delays between the subscribers.

Accordingly, it would be highly advantageous to have a method for efficiently routing bearer traffic between various types of networks and geographic areas in a communication system.

PREFERRED EMBODIMENT OF THE INVENTION

Figure 1:
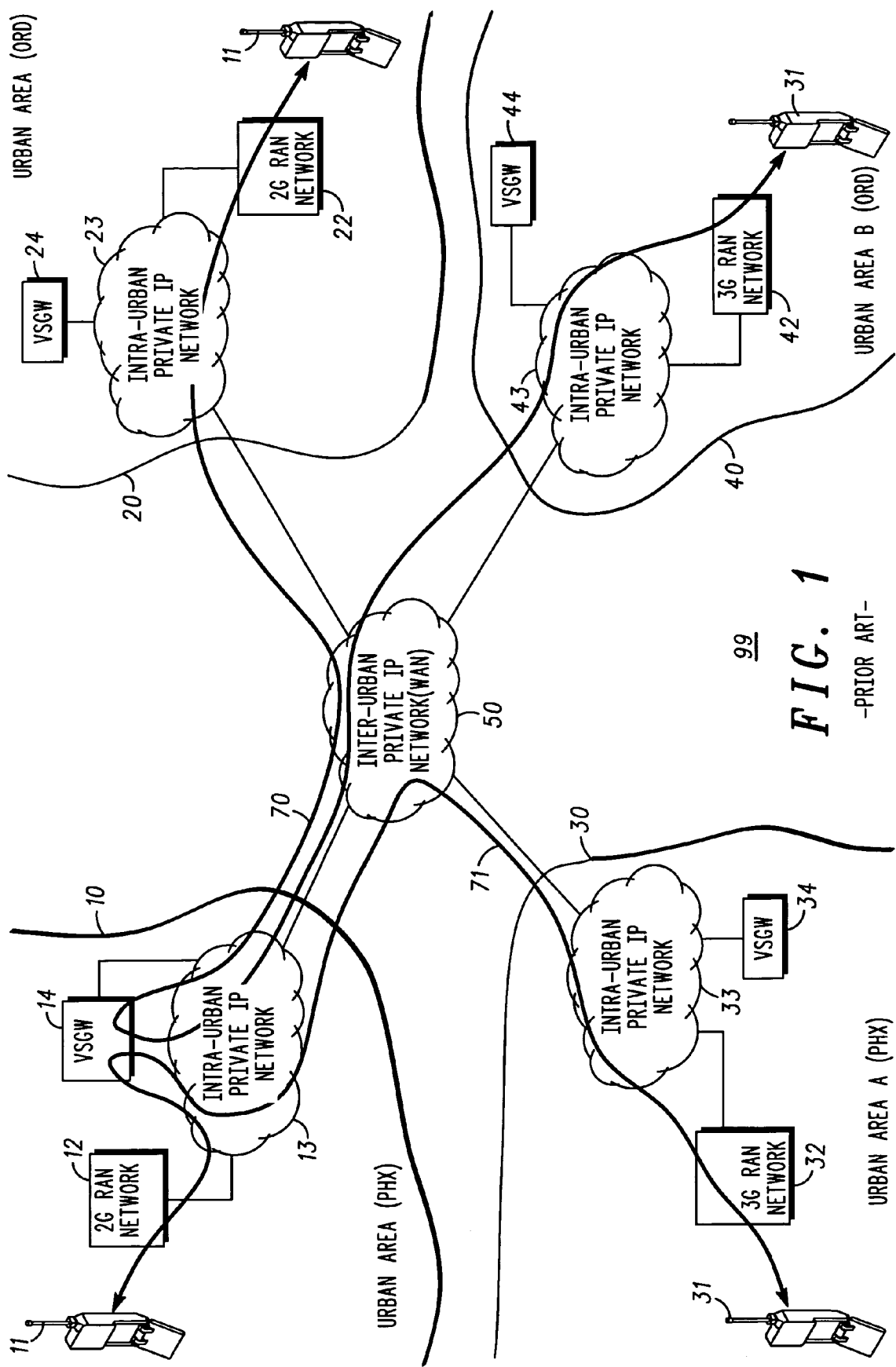
FIG. 1 is a block diagram of bearer traffic flow in accordance with the prior art.

FIG. 1 is a block diagram of bearer traffic routing between 3G networks such as CDMA (Code Division Multiple Access) and 2G networks such as a TDMA (Time Division Multiple Access) networks in communication system 99. One such TDMA network is an iDEN network made by Motorola, Inc. Four urban areas 10-40 are shown. Urban area 10 may be an iDEN type network located in the Phoenix area, for example, network 20 may be an iDEN network located in the Chicago area. Urban area 30 is also located in the Phoenix area, for example, and comprises a 3G network. Similarly, urban area 40 includes a 3G type network, for example, located in the Chicago area. Inter-urban private internet protocol (IP) network 50 connects each of these urban areas to other urban areas for the transmission of signaling and bearer traffic. Network 50 is a wide area network (WAN).

Urban area 10 is a TDMA 2G type network including mobile subscriber 11, 2G RAN (radio access network) 12 such as an iDEN network, intra-urban private IP network 13, and voice signaling gateway (VSGW) 14. The VSGW provides bearer path conversion (such as interworking different vocoders, framing formats, packet sizes, and jitter control) between disparate networks, such as the 3G CDMA network and the 2G iDEN network.

Similarly, urban area 20 which is Chicago (ORD) for example, includes subscriber 11 who has roamed to this area, RAN network 22, intra-urban private IP network 23, and VSGW 24.

Urban area 30 includes mobile subscriber 31 in its home urban Phoenix (PHX), 3G RAN network 32, intra-urban private IP network 33, and VSGW 34.

Similarly, urban area 40 includes mobile subscriber 31 who has roamed to urban area 40, 3G RAN network 42, intra-urban private IP network 43, and voice signaling gateway (VSGW) 44.

Signaling for call setup requires adherence to the rules of each of the networks through which the call is placed. However, the signaling is only a small portion of the information sent through the various networks. Bearer traffic comprises the vast majority of information transmitted between subscribers 11 and 31. The VSGW bearer element is associated with the "home" urban area of the subscribers 2G or iDEN domain.

For a typical call between subscribers 11 and 31 when they are located in their respective home areas 10 and 30 both in Phoenix, for example, the bearer traffic routing for this situation would typically follow path 71. That is, bearer traffic would be sent from mobile subscriber 11 through 2G RAN 12, through intra-urban network 13 and through voice signaling gateway 14 through inter-urban network 50 to intra-urban network 33 through 3G RAN network 32 to subscriber 31. The bearer path traverses the same elements regardless of which subscriber originates the call. No "tromboning" of the bearer path occurs in this scenario.

Now consider when the case when both subscribers 11 and 31 roam into urban areas 20 and 40 respectively. Note subscriber 11's assigned VSGW 14 remains in the "home" 2G or iDEN domain in Phoenix (PHX).

Without the present method, for the case where both subscribers 11 and 31 have roamed to Chicago and are being served by iDEN 2G type network 20 and CDMA 3G type network type 40, the bearer traffic routing follows path 70.

That is, bearer traffic would be routed from subscriber 11 through 2G RAN network 22 in urban area 20, through intra-urban network 23, through inter-urban network 50 through intra-urban IP network 13, through the voice signaling gateway 14 associated with subscriber 11 in his home urban area 10, then back through intra-urban network 13, inter-urban network 50, intra-urban network 43, 3G RAN network 42 to mobile subscriber 41 in urban area 40.

As can be seen readily, this is an inefficient flow for a large amount of bearer traffic. The bearer traffic is flowing from the 2G or iDEN network 20 in Chicago, back to the calling parties home 2G or iDEN network 10 in Phoenix, back to the Chicago area again to the 3G or CDMA network 40 before it reaches the intended called party.

The methodology of the present invention associates the VSGW function with the calling party locally, rather than with the VSGW in the home 2G or 3G domain. In the case of subscriber 11 initiating the call, this will cause the bearer traffic to flow from subscriber 11, through 2G RAN network 22, through intra-urban network 23, through VSGW 24, locally associated with the calling party, and back to network 23, through inter-urban network 50, through intra-urban network 43, to 3G RAN 42 to subscriber 31.

As can be seen, this bearer traffic routing prevents the traffic from being routed back through the home location (area 10) of roaming subscriber 11. Thereby, resources are saved, audio delay improved, and the network equipment is very efficiently utilized. This methodology is explained infra.

Figure 2:
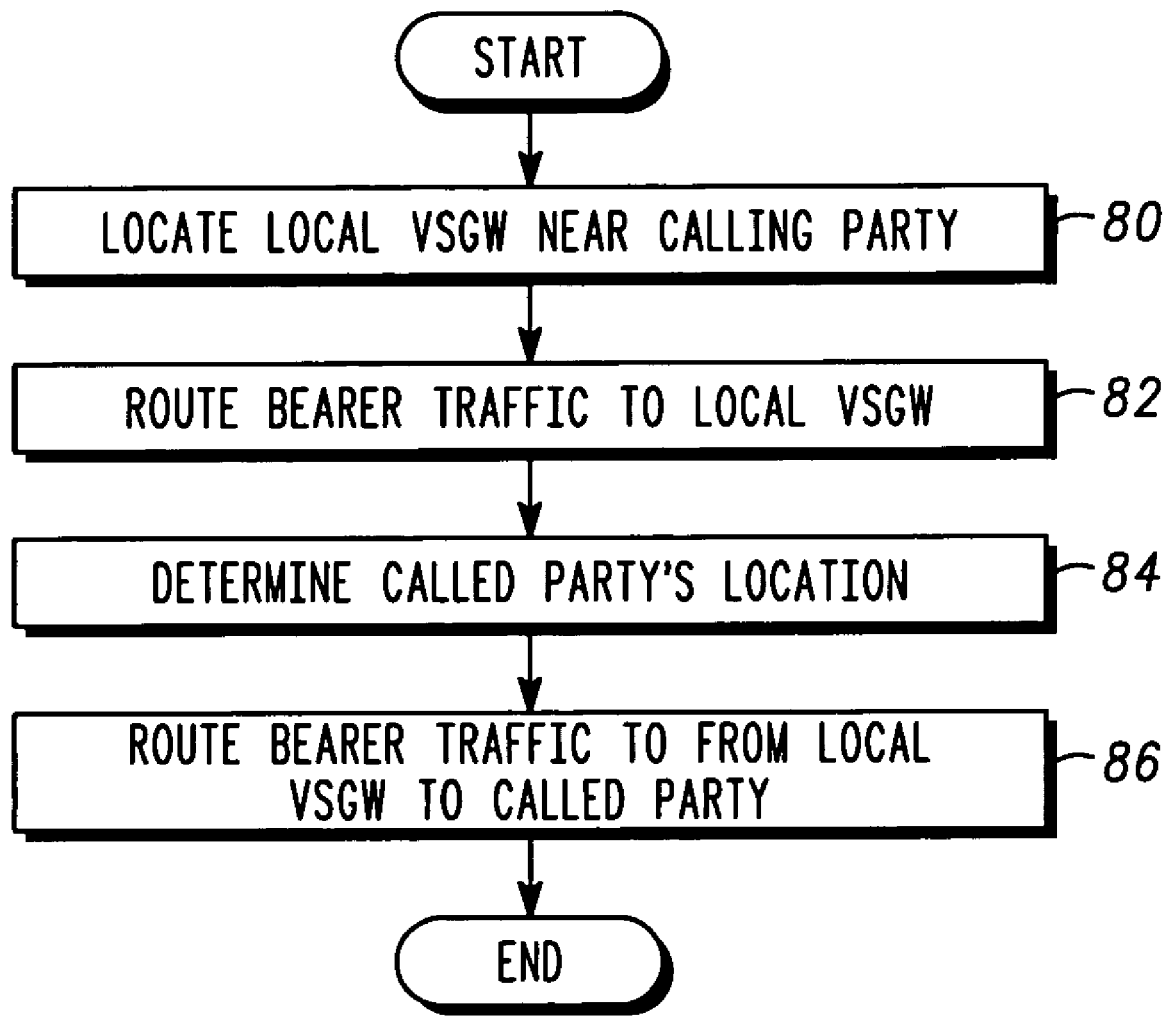
FIG. 2 is a flow chart of a method for efficient bearer traffic routing in accordance with the present invention.
Figure 3:
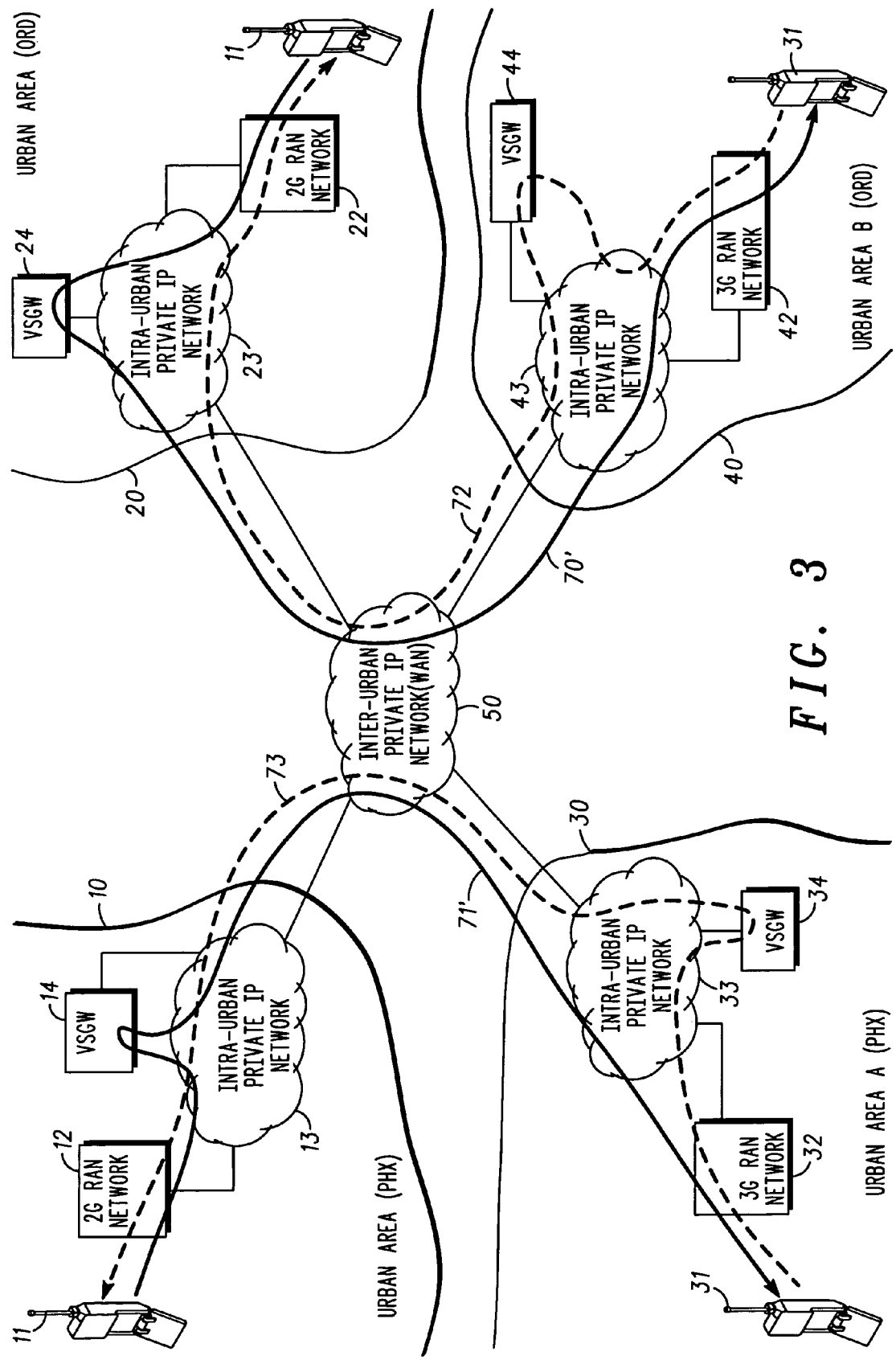
FIG. 3 is a block diagram of efficient bearer traffic routing between 2G networks and 3G networks interconnection in accordance with the present invention.

Referring to FIGS. 2 and 3 taken together, FIG. 2 depicts an embodiment of the methodology for efficient bearer traffic routing and FIG. 3 depicts the bearer traffic flow through the communication system. The method is initiated and block 80 is entered. The 2G or 3G RAN locates a VSGW near the calling party, block 80. This bearer traffic flow is being described for the situation described above. That is, both mobile subscribers 11 and 31 have roamed to areas 20 and 40 respectively and subscriber 11 is calling subscriber 31. The bearer traffic flow being described is 70'. The prior art bearer traffic flow was described in flow 70 in FIG. 1. In addition, this new method no longer produces the same bearer traffic flow as in the prior method of FIG. 1, which was the same regardless of the calling party and was a function of the "home" VSGW. This description is the bearer traffic flow for subscriber 11 initiating the call to subscriber 31. Both subscribers 11 and 31 have roamed to a new area, Phoenix. The call is from a 2G or TDMA type subscriber to a 3G or CDMA type subscriber 31.

Next, 2G network 22 routes the bearer traffic to the local voice signaling gateway (VSGW) 24, block 82. VSGW 24 is the local VSGW for the area 20 in which subscriber 11 is now located. 2G RAN network 22 determines the location of the called subscriber 31, block 84. Since the called subscriber 31 has also roamed, the bearer traffic flow 70' will not be through it home area 30. This flow of bearer traffic would be very inefficient. 2G RAN network 22 instructs VSGW 24 to route the bearer traffic to the new location 40 of subscriber 31, block 86. The bearer traffic flow 70' is then sent from network 23 through inter-urban network 50 through intra-urban network 43 in the new area 40 in which the called subscriber 31 now is located. The bearer traffic flow 70' is then sent through 3G RAN network 42 to subscriber 31. The method is then ended.

A comparison of bearer traffic flow 70 of FIG. 1 with the bearer traffic flow 70' of FIG. 3 using the new method for routing bearer traffic as shown in FIG. 2, show the savings of both time and equipment usage associated the new method. Bearer traffic flow 70' was not routed to network 13 and VSGW 14 in the home area 10. Further, there was no need to route the bearer traffic back from network 13 through inter-urban network 50 to network 43.

For a call from subscriber 31 in 3G network 42 to subscriber 11 in 2G network 22 in area 20, bearer traffic flow 72 is taken. This flow 72 is from a 3G subscriber 31 to a 2G subscriber 11. The method of FIG. 2 is followed. First, the VSGW 44 is located in the calling party's new area 40, block 80. This is VSGW 44. Bearer traffic is transmitted through network 42 to network 43 by network 42.

Next, 3G RAN network 42 routes the bearer traffic to the local voice signaling gateway (VSGW) 44, block 82. VSGW 44 is the local VSGW for the area 40 in which subscriber 31 is now located. 3G RAN network 42 determines the location of the called subscriber 11, block 84. Since the called subscriber 11 has also roamed, the bearer traffic flow 72 will not be through its home area 10. This flow of bearer traffic through area 10 would be very inefficient. The bearer traffic is instead routed to the new location 20 of subscriber 11, block 86. The bearer traffic flow 72 is then sent from network 43 through inter-urban network 50 through intra-urban network 23 in the new area 20 in which the called subscriber 11 now is located. The bearer traffic flow 72 is then sent through 2G RAN network 22 to subscriber 11. The method is then ended.

The steps of locating the local VSGW and sending the bearer traffic through this VSGW allow the bearer traffic to be sent to the new location instead of always sending the bearer traffic to the home location of the called subscriber.

When both subscribers 11 and 31 are in their home locations 10 and 30 respectively, the new method of FIG. 2 produces the bearer traffic flow 71' for a call from subscriber 11 to subscriber 31. A comparison of bearer traffic flow 71' produced with the new method for efficient bearer traffic flow with the bearer traffic flow 71 produced by the prior method indicates the same bearer traffic flow has been produced. The bearer traffic flow 71' is efficient and has not introduced any delay or surplus equipment usage from bearer traffic flow 71 for subscribers in 2G and 3G networks which are both in their home areas.

For a call from subscriber 31 in 3G network 32 to subscriber 11 in 2G network 12 in area 10, bearer traffic flow 73 is followed. This bearer traffic flow 73 is from a 3G subscriber 31 to a 2G subscriber 11. The method of FIG. 2 is followed. First, the VSGW 34 is located in the calling party's area 30, block 80. This is VSGW 34. Bearer traffic is transmitted through 3G RAN network 32 to network 33 by network 32.

Next, 3G RAN network 32 routes the bearer traffic to the local voice signaling gateway (VSGW) 34, block 82. VSGW 34 is the local VSGW for the area 30 in which subscriber 31 is located. 3G RAN network 32 determines the location of the called subscriber 11, block 84. Since the called subscriber 11 is in his home area 10, the bearer traffic flow 73 will be through subscriber 11 home area 10. The bearer traffic is routed to the home location 10 of subscriber 11, block 86. The bearer traffic flow 73 is then sent from network 33 through inter-urban network 50 through intra-urban network 13. The bearer traffic flow 73 is then sent through 2G RAN network 12 to subscriber 11. The method is then ended. Bearer traffic flow 73 is the reverse bearer traffic flow of bearer traffic 71' using the new method of FIG. 2 for a call initiated by subscriber 31 to subscriber 11 when they are both in their home areas 30 and 10, respectively.

It is to be noted that the method of FIG. 2 works equally efficiently for the situation in which one subscriber is roaming and the other subscriber is at its home location.

As can be seen from the above explanations, the method, as set out above, efficiently route bearer traffic between 3G networks and 2G type networks and vice versa, efficiently to avoid the phenomenon of "tromboning" as described in FIG. 1. A further benefit of the methodology described herein is that the voice signaling gateway is instructed by the calling party RAN network to route bearer traffic to the appropriate gateway based upon the user's geographic location whether at home or roaming. Using information in the calling party's serving RAN network, the method can determine the identity of the appropriate VSGW.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a communication system a method for routing bearer traffic between a 3G network and a 2G network, the method for routing bearer traffic comprising the steps of:

if a calling party is roaming into a first network, determining by the first network a local gateway of the first network and in proximity to a calling party;

sending the bearer traffic by the first network to the local gateway; and directly routing the bearer traffic from the local gateway to a called party through a second network in proximity to the called party.

2. In a communication system, the method for routing bearer traffic as claimed in claim 1, wherein there is further included a step of determining a location of the called party.

3. In a communication system, the method for routing bearer traffic as claimed in claim 1, wherein the first network includes the 2G network currently serving the calling party.

4. In a communication system, the method for routing bearer traffic as claimed in claim 3, wherein the second network includes the 3G network currently serving the called party.

5. In a communication system, the method for routing bearer traffic as claimed in claim 1, wherein the first network includes the 3G network currently serving the calling party.

6. In a communication system, the method for routing bearer traffic as claimed in claim 5, wherein the second network includes the 2G network currently serving the called party.

7. In a communication system, the method for routing bearer traffic as claimed in claim 1, wherein the step of directly routing the bearer traffic includes a step of inhibiting transmission of the bearer traffic to a home gateway, if the calling party is roaming.

8. In a communication system, the method for routing bearer traffic as claimed in claim 1, wherein there is further included a step of routing the bearer traffic from the local gateway through an inter-connect network between the first and second networks to the called party.

9. A method for routing bearer traffic between a first network and a second network, the method for routing bearer traffic comprising the steps of:

if a calling party is roaming in the first network, determining by the first network a local gateway of the first network and in proximity to the calling party; and directly routing the bearer traffic from the local gateway to a called party through the second network in proximity to the called party.

10. The method for routing bearer traffic as claimed in claim 9, wherein there is further included a step of sending the bearer traffic by the first network to the local gateway.

11. The method for routing bearer traffic as claimed in claim 9, wherein the step of directly routing the bearer traffic includes a step of inhibiting transmission of the bearer traffic to a home gateway, if the calling party is roaming.

12. The method for routing bearer traffic as claimed in claim 9, wherein there is further included a step of determining a location of the called party.

13. The method for routing bearer traffic as claimed in claim 9, wherein the first network includes a 2G network currently serving the calling party.

14. The method for routing bearer traffic as claimed in claim 13, wherein the second network includes a 3G network currently serving the called party.

15. The method for routing bearer traffic as claimed in claim 9, wherein the first network includes a 3G network currently serving the calling party.

16. The method for routing bearer traffic as claimed in claim 15, wherein the second network includes a 2G network currently serving the called party.

17. The method for routing bearer traffic as claimed in claim 9, wherein there is further included a step of routing the bearer traffic from the local gateway through an inter-connect network between the first and second networks to the called party.

* * * * *